Dec. 16, 1930.  W. F. HIATT  1,784,837
CONNECTING ROD AND CROSSHEAD
Filed Jan. 6, 1930
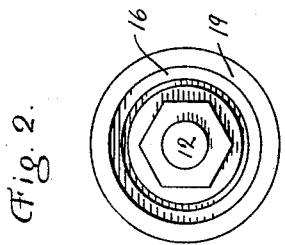
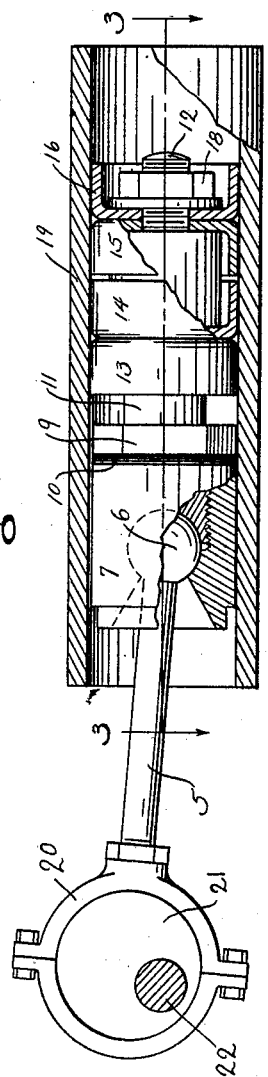
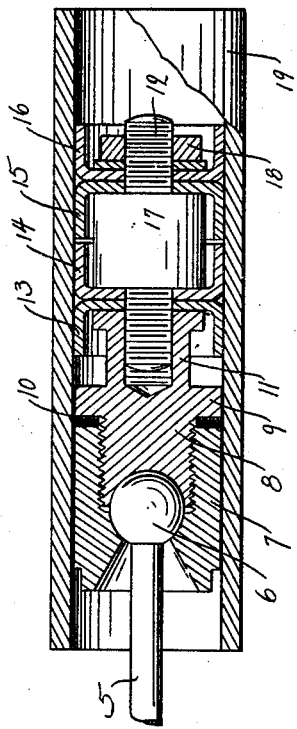
INVENTOR,
William F. Hiatt,
BY Minturn & Minturn,
Attorneys Patented Dec. 16, 1930

1,784,837

UNITED STATES PATENT OFFICE

WILLIAM F. HIATT, OF INDIANAPOLIS, INDIANA, ASSIGNOR OF ONE-HALF TO HENRY D. SKILES, OF INDIANAPOLIS, INDIANA

CONNECTING ROD AND CROSSHEAD

Application filed January 6, 1930. Serial No. 418,808.

This invention relates to the art of connecting rods and particularly to means for receiving and retaining the upper end of a connecting rod in a universal relationship with a cylindrical bore whereby the heretofore customary wrist pin construction is eliminated.

The primary objects of the invention reside in a ball and socket construction which may be readily adjusted to eliminate pounding within the joint; the provision of such a ball and socket construction that may be incorporated directly within a cylinder without the necessity of having to provide a separate crosshead guide; and in the general simplicity of the combination of the various parts combined as will hereinafter be described in reference to the accompanying drawing, in which—

Fig. 1, is a fragmentary side elevation of a structure embodying my invention;

Fig. 2, an end elevation of the cylinder of that structure; and

Fig. 3, a longitudinal transverse section on the line 3—3 in Fig. 1.

Like characters of reference indicate like parts in the several views in the drawing.

I form a connecting rod 5 having a ball 6 formed on its upper end and screw-threaded on its lower end, the main shaft of the rod 5 being reduced in cross section from that of the ball 6 to permit its being passed through the crosshead 7 which has a spherical seat formed therein against which the ball may rest by its under side.

The crosshead 7 is cylindrical in shape and has the seat for the ball 6 formed at a distance therewithin from the outer or upper end and is bored and screw-threaded to receive therein the plug 8 which is cupped out to contact the head or ball 6 by suitable rotation of the plug 8 within the bore.

The plug 8 carries an annular flange 9 having a diameter approaching that of the crosshead 7 having a plurality of shims 10 carried on the plug 8 under the flange 9 as a means of limiting the position of the plug 8 in the crosshead 7 in reference to the ball 6. By removing one or more shims as may be necessary, the plug 8 may be revolved to approach the head 7 to eliminate lost motion therebetween so as to confine the ball 6 closely between its seat in the crosshead 7 and the cupped end of the plug 8 to permit the obtaining of a sliding fit about the ball 6 and to eliminate any excess motion therebetween.

The plug 8 carries a projecting boss 11 which screw-threadedly receives the stud 12. Cup leathers 13, 14, 15 and 16 are carried on the stud 12 spaced apart by the block 17 and held in position by the nut 18 screw-threadedly engaging the outer end of the stud 12. The diameters of the crosshead 7 and the cup leathers are such as to permit their being carried with a sliding fit within a cylinder 19.

By forming the crosshead 7 to have a sliding fit within the cylinder 19, no additional guides are necessary to support the crosshead. The lower end of the connecting rod 5 is screw-threadedly received in the strap 20 which surrounds the eccentric 21 carried on the shaft 22.

The construction here shown is adapted for use in pumping liquids such as in a water pump, but it is obvious that structural deviations may be made from the form here shown and described without departing from the spirit of the invention, and I therefore do not desire to be limited to that precise form any more than may be required by the following claims.

I claim:

1. In a connecting rod structure, a cylinder, a cylindrical crosshead making a sliding fit in the cylinder and having a central bore therethrough, said bore being reduced at a point within the crosshead to form an annular shoulder therearound, a connecting rod having a ball end on a shank and having its shank passed through the bore of the crosshead to have the ball rest against said shoulder, a plug screw-threadedly entering said bore from the end opposite to the rod shank and having a cupped end adapted to contact said ball, and a piston, screw-threadedly engaged to said plug, comprising a threaded stud, a block, a nut screwing on the stud and cup leathers retained on the stud by the nut.

2. In a connecting rod and piston structure, a crosshead making a sliding fit in the cylinder and having a central bore therethrough, said bore being reduced in diameter through one portion to form an annular shoulder therearound, a connecting rod having a shank passed through the bore, and a ball resting against said shoulder, a plug screw-threadedly engaging within the bore and having a cupped end adapted to contact said ball end and press it against said shoulder upon advance of the plug theretowards, a cylinder slidingly receiving the crosshead, a threaded stud screwing in the opposite end of the plug from the cupped end, a block on the stud, a nut on the outer end of the stud, and cup leathers on each side of the block impinged by tightening the nut.

3. In a connecting rod structure a cylinder, a cylindrical crosshead making a sliding fit in the cylinder and having a central bore therethrough, said bore being reduced at a point within the crosshead to form an annular shoulder therearound, a connecting rod having a ball end on a shank and having its shank passed through the bore of the crosshead to have the ball rest against said shoulder, a plug screw-threadedly entering said bore from the end opposite to the rod shank and having a cupped end adapted to contact said ball, an annular flange on said plug making a sliding fit in the cylinder, and shims between said crosshead and said flange, and a piston screw-threadedly engaged to said plug comprising a threaded stud, a block, a nut screwing on the stud and cup leathers retained on the stud by the nut.

4. In a connecting rod and piston structure, a crosshead making a sliding fit in the cylinder having a central bore therethrough, said bore being reduced in diameter through one portion to form an annular shoulder therearound, a connecting rod having a shank passed through the bore and a ball end resting against said shoulder, a plug screw-threadedly engaging within the bore and having a cupped end adapted to contact said ball end and press it against said shoulder upon advance of the plug theretowards, an annular shoulder on the plug making a sliding fit in the cylinder, a plurality of shims between the plug shoulder and the crosshead, a cylinder slidingly receiving the crosshead, a threaded stud screwing in the opposite end of the plug from the cupped end, a block on the stud, a nut on the outer end of the stud and cup-leathers on each side of the block impinged by tightening the nut.

In testimony whereof I affix my signature.

WILLIAM F. HIATT.